No. 769,765. PATENTED SEPT. 13, 1904.
H. H. OPDAHL, Jr.
DRAFT EQUALIZER.
APPLICATION FILED JUNE 2, 1904.
NO MODEL.
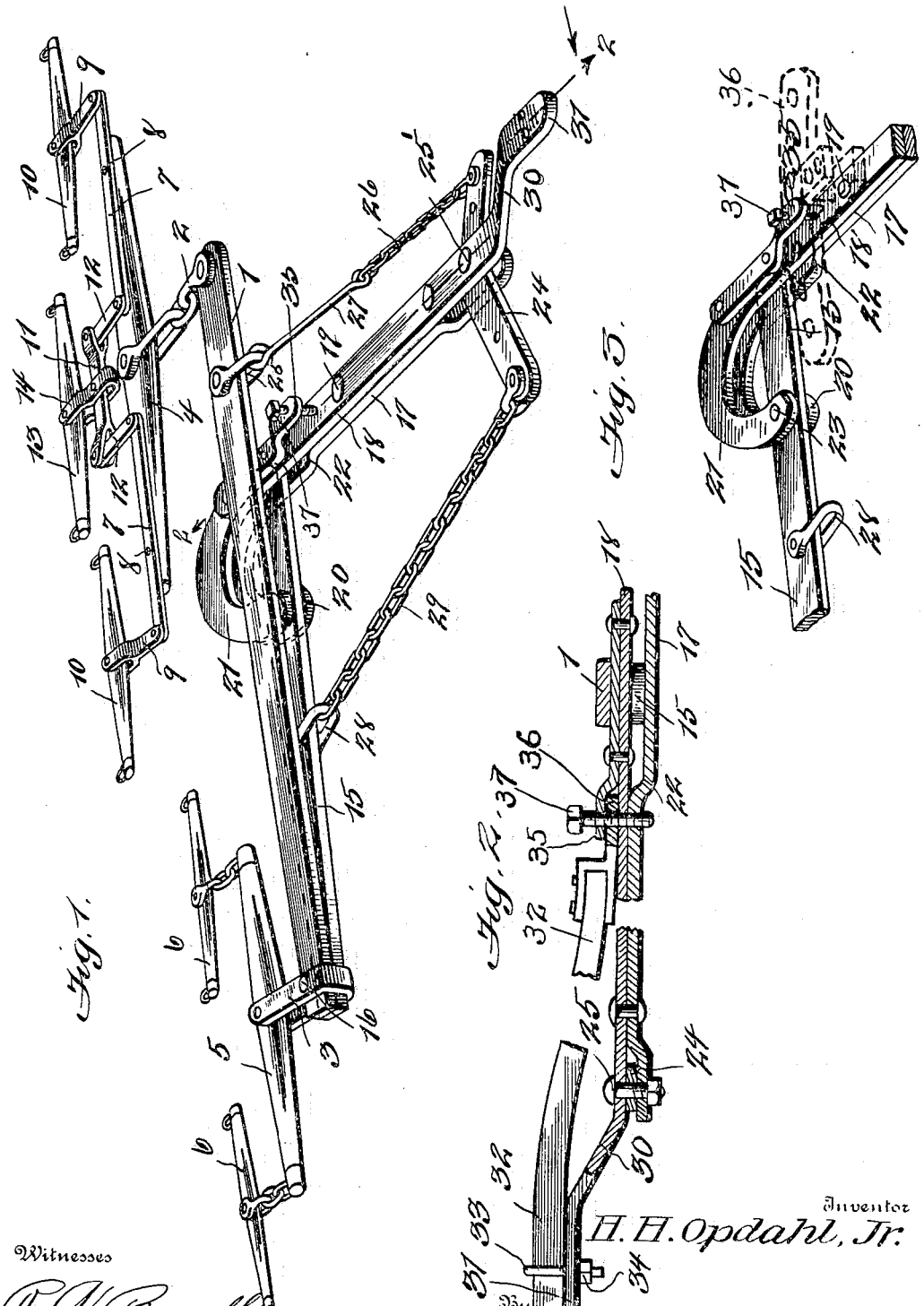
Witnesses
R. V. Boswell
G. Gould.
Inventor
H. H. Opdahl, Jr.
By W. T. Fitzgerald
Attorneys No. 769,765. Patented September 13, 1904.

UNITED STATES PATENT OFFICE.

HELGE H. OPDAHL, JR., OF MINNEOTA, MINNESOTA.

DRAFT-EQUALIZER.

SPECIFICATION forming part of Letters Patent No. 769,765, dated September 13, 1904.

Application filed June 2, 1904. Serial No. 210,873. (No model.)

*To all whom it may concern:*

Be it known that I, HELGE H. OPDAHL, Jr., a citizen of the United States, residing at Minneota, in the county of Lyon and State of Minnesota, have invented certain new and useful Improvements in Draft-Equalizers; and I do hereby declare the following to be a full, clear, and exact description of the invention, such as will enable others skilled in the art to which it appertains to make and use the same.

My invention relates to draft-equalizers; and it consists of certain novel features of combination and construction of parts, the preferred form whereof will be hereinafter clearly set forth, and pointed out in the claim.

The main object of my invention, among others, is to provide an equalizer which is designed especially for the accommodation of five draft-animals, though it is understood that any greater or less number may be employed, according to the adaptation or arrangement of parts.

A further object of my invention is to enable five draft-animals to be attached to a plow, and more particularly a gang-plow, in such a manner that none of the animals will be required to walk upon the newly-plowed ground, but all of them will be upon firm land.

Other objects and advantages will be hereinafter made clearly apparent, reference being had to the accompanying drawings, which are made a part of this application, and in which—

Figure 1 shows a perspective view of my invention complete ready for use. Fig. 2 shows a detail, partly in section, illustrating the preferred manner of connecting my equalizer to the plow-beam. Fig. 3 shows a perspective detail view of a portion of my invention, the other parts being cut away.

For convenience of reference to the various details and coöperating accessories of my invention numerals will be employed, the same numeral applying to a similar part throughout the several views.

While my invention will be found useful for a great variety of purposes, it is especially designed for use in attaching five draft-animals to the beam of a gang or other form of plow, whereby the right-hand horse will be allowed to walk in the newly-made furrow previously made, while the other four animals are allowed to walk upon the unplowed ground, and therefore all of the horses will be firmly footed or landed.

Referring to the numerals on the drawings, 1 designates the main or equalizing bar, each end of which is provided with a suitable clevis, as indicated by the numerals 2 and 3, the clevis 2 being for the purpose of connecting with a three-horse tree 4, while the clevis 3 is to form connection with the doubletree 5, having the swingletrees 6, as is common. The three-horse tree 4 is provided at each end with an equalizing-bar 7, the parts being pivotally connected, as indicated by the numeral 8. The outer ends of the bars 7 are pivotally connected to the members 9, each of which is bifurcated, and between the branches thereof is pivotally attached a swingletree 10.

The inner ends of the equalizing-bars 7 are connected to the ends of the bar 11 by means of the link members 12, as clearly shown in Fig. 1, and the swingletree 13, disposed immediately between the swingletrees 10, is united to the middle of the bar 11 by means of the clevis-like member 14, and it is therefore obvious that the load will be equally distributed by said construction to the three swingletrees 10 and 13. I also provide the auxiliary draft-bar 15, which is normally disposed parallel with the main equalizing-bar 1, as shown in Fig. 1, the outer end of the auxiliary bar being attached to the clevis 3 by the pin or bolt 16, which passes through suitable apertures in said clevis and in an aperture in the end of the main bar 1, which latter aperture is therefore brought into registration with an aperture in the auxiliary bar, so that said pin 16 may be entered therethrough. I also provide means for connecting the main and auxiliary bars to the plow, which in this instance consists of the parallel members 17 and 18, firmly secured together, as by the bolts or rivets 19 or the equivalent thereof.

The said members 17 and 18 are provided, respectively, upon their forward ends with the curved members 20 and 21, disposed parallel with each other and slightly separated, as by bending the member 17 downward at the point indicated by the numeral 22, whereby the inner end of the auxiliary bar 15 is received between the ends of the curved members and pivotally secured by means of the bolt or rivet 23, as clearly shown in Fig. 3. The forward ends of the members 17 and 18 are slightly separated to pivotally receive between them the cross-bar 24, held in position by the bolt or rivet 25', and to the end of the main bar 1 near the clevis 2 I attach the clevis 25, which is placed in connection with the inner end of the cross-bar 24 by means of the chain and link 26 and 27, respectively, while the other end of the bar 24 is placed in connection with the auxiliary bar 15 by means of the clevis 28 and the chain 29 or the equivalent thereof. The member 17 terminates near the pivot-point 25', while the end of the member 18 is extended to provide the slightly upwardly inclined section 30 and the horizontal extension thereof, 31, the latter being designed to be connected to some part of the plow-beam 32, as by the clamping U-shaped bolt 33 and the cross-bar 34, as clearly shown in Fig. 2.

Secured to the member 18 and near the curved end thereof is a strap 35, one end of which is left free and is bent upward to form a receiving-socket for the clevis 36, carried by the inner end of the beam 32. This clevis is of the usual or well-known form and is provided with a plurality of holes, through which take the securing pin or bolt 37, by which means the draft of the plows may be regulated, it being understood that said bolt 37 passes through suitable registering openings in the strap 35 and members 17 and 18.

By the combination and construction of parts just described it will be seen that I have provided means for attaching five draft-animals to a gang or other form of plow, whereby it will be possible for all of the animals to walk upon firm or unplowed land and do so without any side draft and without any tendency to direct the plow-beam laterally out of its course.

The various parts of my invention may be cheaply and expeditiously manufactured of any preferred material and any desired size and each readily assembled in its respective place, and, while I have described the preferred construction and combination of parts, I wish to comprehend in this application all substantial equivalents and substitutes as may be considered as falling fairly within the scope of my invention.

What I claim as new, and desire to secure by Letters Patent, is—

The herein-described draft-equalizer comprising the main and auxiliary members 1 and 15, pivotally connected at their outer ends; two and three horse eveners or trees connected in any suitable manner to the outer ends of the member 1 and the outer end of the auxiliary bar 15, in combination with the member comprising the sections 17 and 18, each having curved parallel terminals at their forward ends; suitable means to pivotally connect the inner end of the auxiliary bar 15 between the ends of said curved terminals; a cross-bar 24 pivoted between the rear ends of said members 17 and 18; means to connect the inner end of said member 24 with the inner end of said member 1 and additional means to similarly connect the auxiliary bar 15 with the outer end of the bar 24 and a clamping-bolt adapted to attach an extension 31 of the member 18 to the beam of the plow whereby the plow may be drawn through the soil thereby, all combined substantially as specified and for the purpose set forth.

In testimony whereof I have signed my name to this specification in the presence of two subscribing witnesses.

HELGE H. OPDAHL, Jr.

Witnesses:
BERNHART SHUMAN,
O. G. REESE.